(12) United States Patent
Au Yeung et al.

(10) Patent No.: US 10,043,375 B2
(45) Date of Patent: Aug. 7, 2018

(54) MOBILE TERMINAL ALARM METHOD AND APPARATUS

(71) Applicant: Huawei Technologies Co., Ltd., Shenzhen (CN)

(72) Inventors: Ching Man Au Yeung, Shenzhen (CN); Xiaojuan Ma, Shenzhen (CN); Wing Ki Leung, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 15/260,412

(22) Filed: Sep. 9, 2016

(65) Prior Publication Data

US 2016/0379478 A1 Dec. 29, 2016

Related U.S. Application Data

(63) Continuation of application No. PCT/CN2014/092905, filed on Dec. 3, 2014.

(30) Foreign Application Priority Data

Mar. 18, 2014 (CN) .......................... 2014 1 0101516

(51) Int. Cl.
 *G08B 25/01* (2006.01)
 *G08B 21/04* (2006.01)
 *H04M 1/725* (2006.01)
(52) U.S. Cl.
 CPC ....... *G08B 25/016* (2013.01); *G08B 21/0461* (2013.01); *H04M 1/72569* (2013.01)

(58) Field of Classification Search
 CPC ............. G08B 21/0461; G08B 25/016; H04M 1/72569
 See application file for complete search history.

(56) References Cited

U.S. PATENT DOCUMENTS

2008/0094230 A1   4/2008   Mock et al.
2014/0094191 A1*  4/2014   Luo .................. H04W 4/02
                                          455/456.3

FOREIGN PATENT DOCUMENTS

| CN | 101091404 A | 12/2007 |
| CN | 101790000 A | 7/2010 |
| CN | 102057411 A | 5/2011 |
| CN | 102483878 A | 5/2012 |
| CN | 103106374 A | 5/2013 |
| CN | 103167108 A | 6/2013 |
| CN | 103247144 A | 8/2013 |

(Continued)

OTHER PUBLICATIONS

Yoon, S., et al., "Architecture of Automatic Warning System on Urgent Traffic situation for Headphone Users," International Journal of Multimedia and Ubiquitous Engineering, vol. 7, No. 2, Apr. 2012, pp. 421-426.

(Continued)

*Primary Examiner* — Nader Bolourchi
(74) *Attorney, Agent, or Firm* — Conley Rose, P.C.

(57) ABSTRACT

A mobile terminal alarm method and apparatus are provided. The method includes collecting environmental data of a mobile terminal; determining, according to the environmental data, a scenario in which the mobile terminal is located; and sending, when the scenario meets a preset alarm condition, and the mobile terminal is in a preset state, an alarm in an alarm manner corresponding to the preset state.

12 Claims, 4 Drawing Sheets

(56) References Cited

FOREIGN PATENT DOCUMENTS

| CN | 103578288 A | 2/2014 |
|----|-------------|--------|
| CN | 103607490 A | 2/2014 |
| JP | 2009129216 A | 6/2009 |
| JP | 2011091717 A | 5/2011 |
| WO | 2011033365 A2 | 3/2011 |

OTHER PUBLICATIONS

Machine Translation and Abstract of Chinese Publication No. CN103106374, May 15, 2013, 3 pages.
Machine Translation and Abstract of Chinese Publication No. CN103247144, Aug. 14, 2013, 19 pages.
Machine Translation and Abstract of Chinese Publication No. CN103607490, Feb. 26, 2014, 5 pages.
Foreign Communication From a Counterpart Application No. 201410101516.5, Chinese Office Action dated Nov. 2, 2016, 9 pages.
Foreign Communication From a Counterpart Application, PCT Application No. PCT/CN2014/092905, English Translation of International Search Report dated Mar. 6, 2015, 2 pages.
Foreign Communication From a Counterpart Application, PCT Application No. PCT/CN2014/092905, English Translation of Written Opinion dated Mar. 6, 2015, 7 pages.

* cited by examiner

MOBILE TERMINAL ALARM METHOD AND APPARATUS

CROSS-REFERENCE TO RELATED APPLICATIONS

This application is a continuation of International Application No. PCT/CN2014/092905, filed on Dec. 3, 2014, which claims priority to Chinese Patent Application No. 201410101516.5, filed on Mar. 18, 2014, both of which are hereby incorporated by reference in their entireties.

TECHNICAL FIELD

The present disclosure relates to the field of communications technologies, and in particular, to a mobile terminal alarm method and apparatus.

BACKGROUND

In recent years, mobile terminals (such as a smartphone and a tablet computer) are very popular. In addition, the mobile Internet has become increasingly widespread. When going out, a user usually uses these mobile terminals to listen to music, view a video, browse a website, or contact friends using instant messaging applications.

When using these applications, the user needs to watch a screen for a long time, and even wears headsets when listening to music, viewing a video, or playing a game. A phenomenon of walking on a street while using a mobile terminal has become increasingly common. When attention of a user is focused on a mobile terminal, the user usually fails to notice a change in an ambient environment or a sudden situation, thereby causing various accidents. For example, a user fails, when going across a road, to notice whether there is a coming car, a user fails, when taking an escalator, to notice that an end is approaching, and the like. Consequences of these accidents may be very slight, or may be very severe. However, existing mobile terminals fail to have a very effective method for avoiding the consequences of these accidents.

SUMMARY

Embodiments of the present disclosure provide a mobile terminal alarm method and apparatus, so as to resolve a problem in the prior art that a mobile terminal is incapable of warning a user to avoid an unexpected situation.

According to a first aspect, a mobile terminal alarm method is provided, including collecting environmental data of a mobile terminal; determining, according to the environmental data, a scenario in which the mobile terminal is located; and sending, when the scenario meets a preset alarm condition, and the mobile terminal is in a preset state, an alarm in an alarm manner corresponding to the preset state.

With reference to the first aspect, in a first possible implementation manner, the determining, according to the environmental data, a scenario in which the mobile terminal is located includes performing matching between the environmental data and preset environmental scenario data, and determining, according to a matching result, the scenario in which the mobile terminal is located.

With reference to the first aspect or the first possible implementation manner of the first aspect, in a second possible implementation manner, after the determining, according to the environmental data, a scenario in which the mobile terminal is located, the method further includes determining, according to personal information of a user, whether the scenario in which the mobile terminal is located affects health of the user, where the sending, when the scenario meets a preset alarm condition, and the mobile terminal is in a preset state, an alarm in an alarm manner corresponding to the preset state includes sending, when the scenario in which the mobile terminal is located affects the health of the user, and the mobile terminal is in the preset state, the alarm in the alarm manner corresponding to the preset state.

With reference to the first aspect, the first possible implementation manner of the first aspect, or the second possible implementation manner of the first aspect, in a third possible implementation manner, after the determining, according to the environmental data, a scenario in which the mobile terminal is located, the method further includes acquiring scenario data whose degree of matching with the scenario is greater than a preset threshold; and determining whether the scenario data represents that a potential danger exists in the scenario, where the sending, when the scenario meets a preset alarm condition, and the mobile terminal is in a preset state, an alarm in an alarm manner corresponding to the preset state includes sending, when the scenario data represents that a potential danger exists in the scenario, and the mobile terminal is in the preset state, the alarm in the alarm manner corresponding to the preset state.

With reference to the first aspect, the first possible implementation manner of the first aspect, the second possible implementation manner of the first aspect, or the third possible implementation manner of the first aspect, in a fourth possible implementation manner, the sending an alarm in an alarm manner corresponding to the preset state includes querying a control manner corresponding to the preset state; and sending the alarm in the control manner.

According to a second aspect, a mobile terminal alarm apparatus is provided, including a data collecting unit configured to collect environmental data of a mobile terminal; a scenario determining unit configured to determine, according to the environmental data collected by the data collecting unit, a scenario in which the mobile terminal is located; and an alarming unit configured to send, when the scenario determined by the scenario determining unit meets a preset alarm condition, and the mobile terminal is in a preset state, an alarm in an alarm manner corresponding to the preset state.

With reference to the second aspect, in a first possible implementation manner, the scenario determining unit is configured to perform matching between the environmental data and preset environmental scenario data, and determine, according to a matching result, the scenario in which the mobile terminal is located.

With reference to the second aspect or the first possible implementation manner of the second aspect, in a second possible implementation manner, the apparatus further includes a first judging unit configured to determine, according to personal information of a user, whether the scenario in which the mobile terminal is located affects health of the user, where the alarming unit is configured to send, when the first judging unit determines that the scenario in which the mobile terminal is located affects the health of the user, and the mobile terminal is in the preset state, the alarm in the alarm manner corresponding to the preset state.

With reference to the second aspect, the first possible implementation manner of the second aspect, or second possible implementation manner of the second aspect, in a third possible implementation manner, the apparatus further includes a scenario data acquiring unit configured to acquire scenario data whose degree of matching with the scenario is greater than a preset threshold; and a second judging unit configured to determine whether the scenario data acquired by the scenario data acquiring unit represents that a potential danger exists in the scenario, where the alarming unit is configured to send, when the second judging unit determines that the scenario data represents that a potential danger exists in the scenario, and the mobile terminal is in the preset state, the alarm in the alarm manner corresponding to the preset state.

With reference to the second aspect, the first possible implementation manner of the second aspect, the second possible implementation manner of the second aspect, or the third possible implementation manner of the second aspect, in a fourth possible implementation manner, the alarming unit includes a query module configured to query a control manner corresponding to the preset state; and an alarm module configured to send the alarm in the control manner queried by the query module.

A beneficial effect of the embodiments of the present disclosure is as follows.

In the embodiments of the present disclosure, by collecting environmental data of a mobile terminal, determining, according to the collected environmental data, a scenario in which the mobile terminal is located, and sending, when the determined scenario meets a preset alarm condition and the mobile terminal is in a preset state, an alarm in an alarm manner corresponding to the preset state, a user may avoid an unexpected situation to the utmost extent.

DESCRIPTION OF EMBODIMENTS

Embodiments of the present disclosure provide a mobile terminal alarm solution for a problem that a mobile terminal is incapable of warning a user to avoid an unexpected situation.

Currently, there are some solutions for warning a user of a car when the user goes across a road. However, the methods can only further warn a user after an external alarm has been sent (for example, honk sent by a coming car), and fail to pre-warn the user as early as possible that a potential danger exists. Some other methods intend to detect whether an area near a user is an area with a high crime frequency and provide the user with an alert or a warning. However, these methods fail to cope with more dangers that a user encounters in daily life, and fail to take personalized determining into consideration.

On the basis of defects of the foregoing existing methods, the embodiments of the present disclosure provide a mobile terminal alarm method and apparatus. In the technical solutions, by collecting environmental data of a mobile terminal, determining, according to the collected environmental data, a scenario in which the mobile terminal is located, and sending, when the determined scenario meets a preset alarm condition and the mobile terminal is in a preset state, an alarm in an alarm manner corresponding to the preset state, a user may avoid an unexpected situation to the utmost extent.

A main implementation principle, and specific implementation manners and corresponding achievable beneficial effects of the technical solutions of the embodiments of the present disclosure are described in detail below with reference to the accompanying drawings of the specification.

Figure 1:
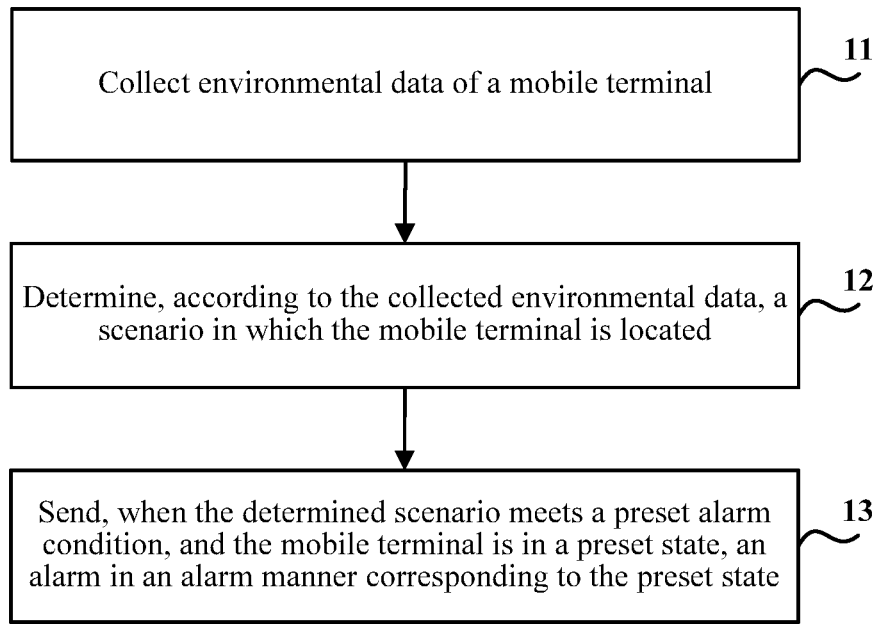
FIG. 1 is a flowchart of a main implementation principle of an embodiment of the present disclosure.

As shown in FIG. 1, a main implementation principle of an embodiment of the present disclosure is as in the following steps.

Step 11: Collect environmental data of a mobile terminal.

Various apparatuses in a mobile terminal may be configured to collect data related to an ambient environment, where the various apparatuses in the mobile terminal may include, but are not limited to, a global positioning system (GPS) sensor, a mobile phone microphone, an acceleration sensor, a motion sensor, a light sensor, and the like.

On the basis of the aforementioned apparatuses, the collected data related to the ambient environment may include, but is not limited to the following information: geographic location information, moving speed information, moving direction information, gravitational acceleration information, sound information, and the like.

Step 12: Determine, according to the collected environmental data, a scenario in which the mobile terminal is located.

Matching between the collected environmental data and preset environmental scenario data may be performed, and a scenario in which the mobile terminal is located is determined according to a matching result, where the preset environmental scenario data may be preset in a database in the mobile terminal.

Step 13: Send, when the determined scenario meets a preset alarm condition, and the mobile terminal is in a preset state, an alarm in an alarm manner corresponding to the preset state.

Before step 13 is performed, the following operations may be further performed: after the scenario in which the mobile terminal is located is determined according to the collected environmental data, acquiring, from an external third-party database, scenario data whose degree of matching with the determined scenario is greater than a preset threshold, and then determining whether the scenario data represents that a potential danger exists in the scenario in which the mobile terminal is located.

In this case, step 13 may include sending, when the acquired scenario data represents that a potential danger exists in the scenario in which the mobile terminal is located, and the mobile terminal is in the preset state, the alarm in the alarm manner corresponding to the preset state.

For example, after it is determined that a scenario in which a mobile terminal is located is a road A, scenario data whose degree of matching with the road A is greater than a preset threshold is acquired by querying a database of a municipal government (a third-party database), that is, a road maintenance project is performed on the road A. Therefore, the scenario data represents that a potential danger exists in the road A and the mobile terminal is in a preset state, and then an alarm is sent in an alarm manner corresponding to the preset state.

For another example, after it is determined that a scenario in which a mobile terminal is located is a road A, scenario data whose degree of matching with the road A is greater than a preset threshold is acquired by querying a road traffic network (a third-party database), that is, currently, a relatively large quantity of vehicles are in the road A, and a hazard index is relatively large. Therefore, the scenario data represents that a potential danger exists in the road A and the mobile terminal is in a preset state, and then an alarm is sent in an alarm manner corresponding to the preset state.

Besides the foregoing manner, before step 13, the following operation may be further performed after the scenario in which the mobile terminal is located is determined according to the collected environmental data, determining, according to personal information of a user, whether the scenario in which the mobile terminal is located affects health of the user.

In this case, step 13 may include sending, when the scenario in which the mobile terminal is located affects the health of the user, and the mobile terminal is in the preset state, the alarm in the alarm manner corresponding to the preset state.

For example, after it is determined that a scenario in which a mobile terminal is located is a road A, a quality value of air near the road A is obtained by querying a database of an environmental protection bureau (a third-party database), and pre-obtained personal information of a user records that the user is currently infected with a respiratory-related disease. Therefore, it can be determined that the scenario in which the mobile terminal is located affects health of the user (that is, the quality value of the air near the road A exceeds a bearable value of the user (the bearable value may be determined according to a recorded respiratory infection degree)), and the mobile terminal is in a preset state; and then, an alarm is sent in an alarm manner corresponding to the preset state.

This manner uses personal information of a user, thereby enabling a determining result to be more flexible and more personalized.

Besides, when an alarm is sent in an alarm manner corresponding to a preset state, a most direct alarm manner is outputting an alarm message, and the alarm message may be presented using a text, an image, or a sound, or in another manner that can function to warn.

Besides outputting an alarm message, a preset state of a mobile terminal may also be automatically controlled, and attention of a user is transferred from an application to an actual physical environment, so as to help the user avoid a potential danger. First, a control manner corresponding to the preset state of the mobile terminal is queried, and second, an alarm is sent in the queried control manner.

The preset state of the mobile terminal may be a preset application program is running in the mobile terminal, and different application programs may correspond to different control manners. The preset application programs may include, but are not limited to a media player, a game, a browser, a social application, and the like, and therefore, the control manners may include controlling volume, controlling screen brightness, and the like.

For example, when a user listens to music using a mobile terminal, and if a media player is running in the mobile terminal when it is determined that a scenario in which the mobile terminal is located meets a preset alarm condition, volume of the mobile terminal is automatically turned down or turned off.

For another example, when a user plays a game using a mobile terminal, and if the game is running in the mobile terminal when it is determined that a scenario in which the mobile terminal is located meets a preset alarm condition, screen brightness and volume are both automatically turned down.

In this embodiment of the present disclosure, by collecting environmental data of a mobile terminal, determining, according to the collected environmental data, a scenario in which the mobile terminal is located, and sending, when the determined scenario meets a preset alarm condition and the mobile terminal is in a preset state, an alarm in an alarm manner corresponding to the preset state, a user may avoid an unexpected situation to the utmost extent.

Figure 2:
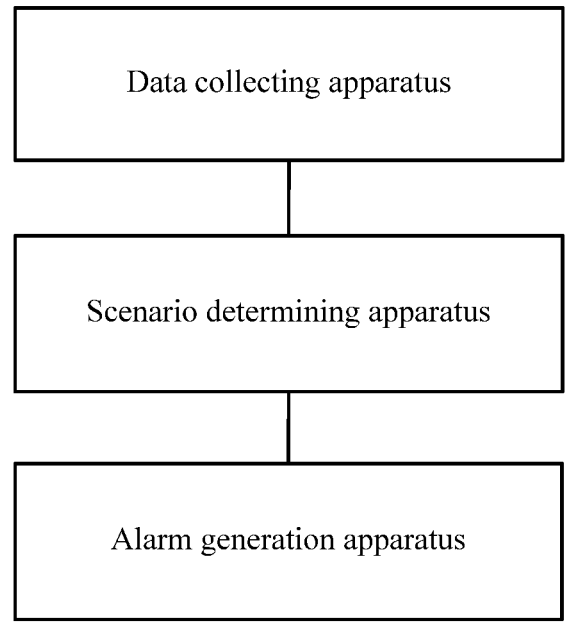
FIG. 2 is a schematic structural diagram of an alarm system for implementing a mobile terminal alarm method according to an embodiment of the present disclosure.
Figure 3:
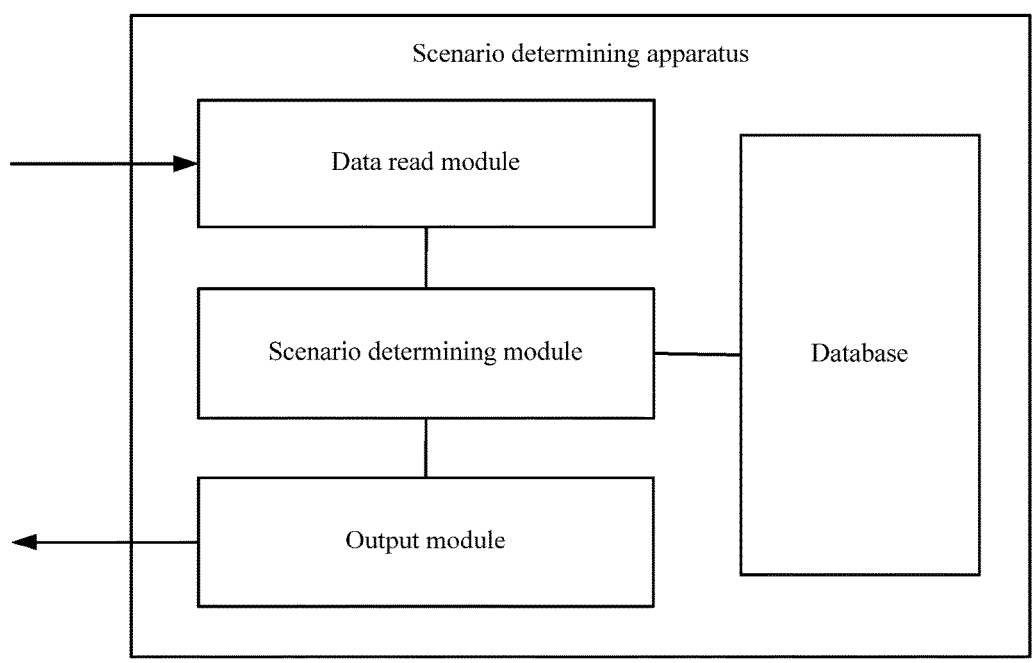
FIG. 3 is a schematic structural diagram of a scenario determining apparatus in an alarm system.

A schematic structural diagram of an alarm system for implementing the foregoing method is shown in FIG. 2, and the alarm system includes a data collecting apparatus, a scenario determining apparatus, and an alarm generation apparatus. A schematic structural diagram of the scenario determining apparatus is shown in FIG. 3, and the scenario determining apparatus includes a data read module, a scenario determining module, an output module, and databases, where the databases include a database preset in the mobile terminal, and further include a third-party database connected to a network using the Internet.

Figure 4:
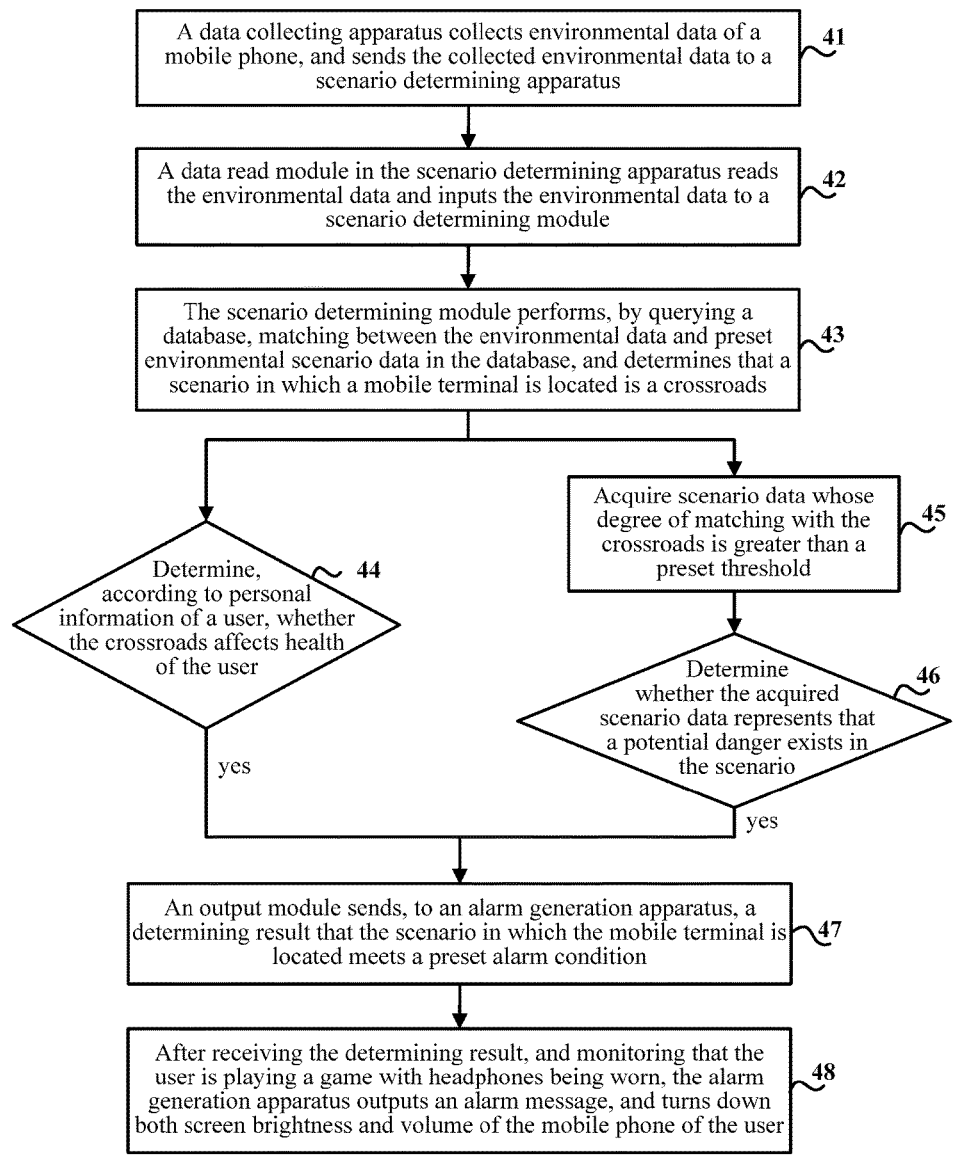
FIG. 4 is a flowchart of specific implementation of a mobile terminal alarm method according to an embodiment of the present disclosure.

The alarm method provided in the embodiments of the present disclosure is exemplified below on the basis of the foregoing alarm system. As shown in FIG. 4, FIG. 4 is a flowchart of specific implementation of a mobile terminal alarm method according to an embodiment of the present disclosure. It is assumed that a user is approaching a busy intersection, and playing, using a mobile phone, a game with headsets being worn, and it is assumed that the foregoing alarm system has been installed in the mobile phone of the user.

Step 41: A data collecting apparatus collects environmental data of a mobile phone, and sends the collected environmental data to a scenario determining apparatus.

In this embodiment of the present disclosure, descriptions are made using a GPS positioning apparatus and sensors (may include an acceleration sensor, a motion sensor, and the like) of a mobile phone as examples, where the GPS positioning apparatus may acquire latitude and longitude of a geographical location at which the user is located, and the sensors may acquire a current advancing direction and traveling speed of the user.

Step 42: A data read module in the scenario determining apparatus reads the environmental data and inputs the environmental data to a scenario determining module.

Step 43: The scenario determining module performs, by querying a database, matching between the environmental data and preset environmental scenario data in the database, and determines that a scenario in which a mobile terminal is located is a crossroads.

Step 44: Determine, according to personal information of a user, whether the crossroads affects health of the user, and if a determining result is yes, perform step 47; otherwise, perform no operation.

Step 45: Acquire scenario data whose degree of matching with the crossroads is greater than a preset threshold, such as a road traffic condition of the crossroads.

Step 46: Determine whether the acquired scenario data represents that a potential danger exists in the scenario, and if a determining result is yes, perform step 47; otherwise, perform no operation.

It should be noted that as long as one condition of step 44 and step 46 is met, step 47 may be entered. In actual application, the two manners may be used in an alternative way, or may be used in a combined way, which is not limited in this embodiment of the present disclosure.

Step 47: An output module sends, to an alarm generation apparatus, a determining result that the scenario in which the mobile terminal is located meets a preset alarm condition.

Step 48: After receiving the determining result, and monitoring that the user is playing a game with headsets being worn, that is, a current running application of the mobile phone is a preset application, the alarm generation apparatus outputs an alarm message, and turns down both screen brightness and volume of the mobile phone of the user.

In this embodiment of the present disclosure, by collecting environmental data of a mobile terminal, determining, according to the collected environmental data, a scenario in which the mobile terminal is located, and sending, when the determined scenario meets a preset alarm condition and the mobile terminal is in a preset state, an alarm in an alarm manner corresponding to the preset state, a user may avoid an unexpected situation to the utmost extent.

Figure 5:
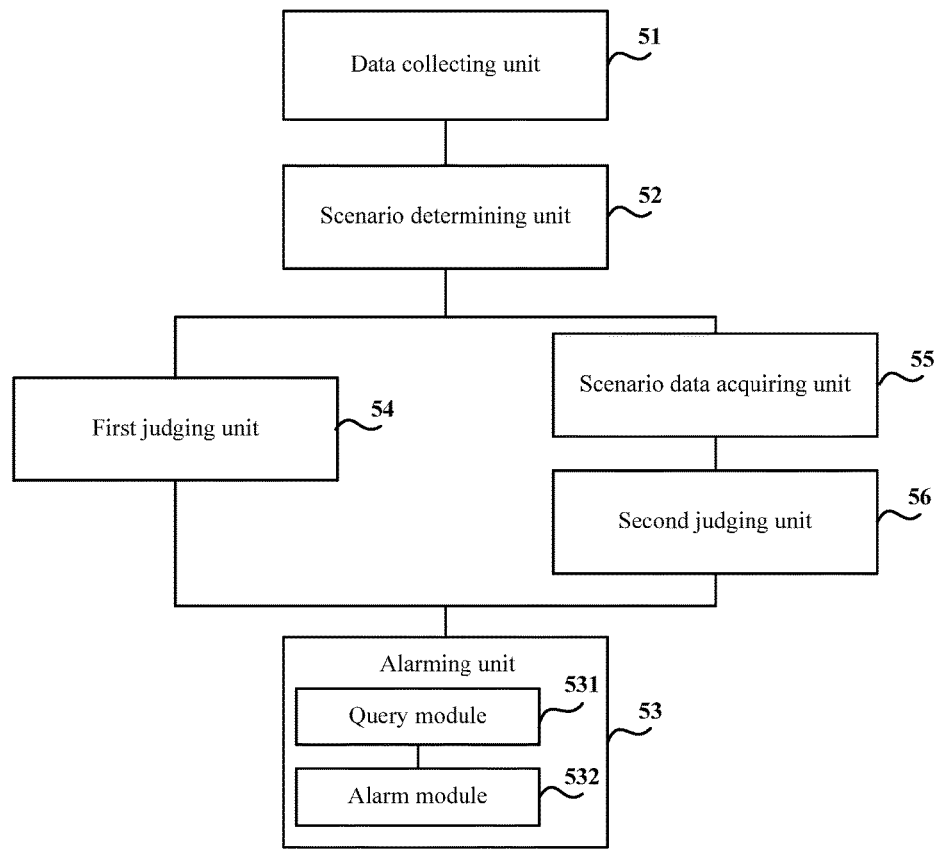
FIG. 5 is a schematic structural diagram of a mobile terminal alarm apparatus according to an embodiment of the present disclosure.

On the basis of the foregoing inventive concept, an embodiment of the present disclosure further provides a mobile terminal alarm apparatus. As shown in FIG. 5, FIG. 5 is a schematic structural diagram of the alarm apparatus, including a data collecting unit 51 configured to collect environmental data of a mobile terminal; a scenario determining unit 52 configured to determine, according to the environmental data collected by the data collecting unit 51, a scenario in which the mobile terminal is located; an alarming unit 53 configured to send, when the scenario determined by the scenario determining unit 52 meets a preset alarm condition, and the mobile terminal is in the preset state, the alarm in the alarm manner corresponding to the preset state.

The scenario determining unit 52 is configured to perform matching between the environmental data and preset environmental scenario data, and determine, according to a matching result, the scenario in which the mobile terminal is located.

The apparatus further includes a first judging unit 54 configured to determine, according to personal information of a user, whether the scenario in which the mobile terminal is located affects health of the user, where the alarming unit 53 is configured to send, when the first judging unit 54 determines that the scenario in which the mobile terminal is located affects the health of the user, and the mobile terminal is in the preset state, the alarm in the alarm manner corresponding to the preset state.

The apparatus further includes a scenario data acquiring unit 55 configured to acquire scenario data whose degree of matching with the scenario is greater than a preset threshold; and a second judging unit 56 configured to determine whether the scenario data acquired by the scenario data acquiring unit 55 represents that a potential danger exists in the scenario, where the alarming unit 53 is configured to send, when the second judging unit 56 determines that the scenario data represents that a potential danger exists in the scenario, and the mobile terminal is in the preset state, the alarm in the alarm manner corresponding to the preset state.

The alarming unit 53 includes a query module 531 configured to query a control manner corresponding to the preset state; and an alarm module 532 configured to send the alarm in the control manner queried by the query module 531.

Figure 6:
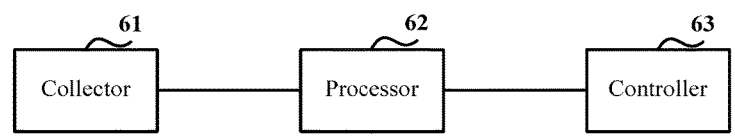
FIG. 6 is a schematic structural diagram of hardware of a mobile terminal alarm apparatus according to an embodiment of the present disclosure.

Accordingly, an embodiment of the present disclosure further provides a mobile terminal alarm apparatus. As shown in FIG. 6, FIG. 6 is a schematic structural diagram of hardware of the alarm apparatus, including a collector 61, a processor 62, and a controller 63, where the collector 61 is configured to collect environmental data of a mobile terminal; the processor 62 is configured to determine, according to the environmental data, a scenario in which the mobile terminal is located; and the controller 63 is configured to send, when the scenario meets a preset alarm condition, and the mobile terminal is in a preset state, an alarm in an alarm manner corresponding to the preset state.

The processor 62 is configured to perform matching between the environmental data and preset environmental scenario data, and determine, according to a matching result, the scenario in which the mobile terminal is located.

The processor 62 is further configured to determine, according to personal information of a user, whether the scenario in which the mobile terminal is located affects health of the user.

The controller 63 is configured to send, when the scenario in which the mobile terminal is located affects the health of the user, and the mobile terminal is in the preset state, the alarm in the alarm manner corresponding to the preset state.

The processor 62 is further configured to acquire scenario data whose degree of matching with the scenario is greater than a preset threshold, and determine whether the scenario data represents that a potential danger exists in the scenario.

The controller 63 is configured to send, when the scenario data represents that a potential danger exists in the scenario, and the mobile terminal is in the preset state, the alarm in the alarm manner corresponding to the preset state.

The controller 63 is further configured to query a control manner corresponding to the preset state, and send the alarm in the control manner.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc-read only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A mobile terminal alarm method, comprising:
    collecting environmental data of a mobile terminal;
    determining, according to the environmental data, a scenario in which the mobile terminal is located;
    acquiring scenario data whose degree of matching with the scenario is greater than a preset threshold;
    determining whether the scenario data represents that a potential danger exists in the scenario; and
    sending an alarm in an alarm manner corresponding to a preset state when the scenario meets a preset alarm condition of the scenario data representing that a potential danger exists in the scenario, and when the mobile terminal is in the preset state.

2. The method according to claim 1, wherein determining, according to the environmental data, the scenario in which the mobile terminal is located comprises:
    performing matching between the environmental data and preset environmental scenario data; and
    determining, according to a matching result, the scenario in which the mobile terminal is located.

3. The method according to claim 1, wherein after determining, according to the environmental data, the scenario in which the mobile terminal is located, the method further comprises determining, according to personal information of a user, whether the scenario in which the mobile terminal is located affects health of the user, and
    wherein sending the alarm in the alarm manner corresponding to the preset state when the scenario meets the preset alarm condition, and when the mobile terminal is in the preset state comprises sending the alarm in the alarm manner corresponding to the preset state when the scenario in which the mobile terminal is located affects the health of the user, and when the mobile terminal is in the preset state.

4. The method according to claim 1, wherein sending the alarm in the alarm manner corresponding to the preset state comprises:
    querying a control manner corresponding to the preset state; and
    sending the alarm in the control manner.

5. A mobile terminal alarm apparatus, comprising:
    a memory storing executable instructions;
    a processor coupled to the memory, wherein the processor is configured to execute the instructions and cause the mobile terminal alarm apparatus to:
        collect environmental data of a mobile terminal;
        determine, according to the collected environmental data, a scenario in which the mobile terminal is located;
        acquire scenario data whose degree of matching with the scenario is greater than a preset threshold;
        determine whether the acquired scenario data represents that a potential danger exists in the scenario; and
        send an alarm in an alarm manner corresponding to a preset state when the scenario meets a preset alarm condition of the scenario data representing that a potential danger exists in the scenario, and when the mobile terminal is in the preset state.

6. The apparatus according to claim 5, wherein the processor is further configured to cause the mobile terminal alarm apparatus to:
    perform matching between the environmental data and preset environmental scenario data; and
    determine, according to a matching result, the scenario in which the mobile terminal is located.

7. The apparatus according to claim 5, wherein the processor is further configured to cause the mobile terminal alarm apparatus to:
    determine, according to personal information of a user, whether the scenario in which the mobile terminal is located affects health of the user; and
    send the alarm in the alarm manner corresponding to the preset state when the scenario in which the mobile terminal is located affects the health of the user, and when the mobile terminal is in the preset state.

8. The apparatus according to claim 5, wherein the processor is further configured to cause the mobile terminal alarm apparatus to:
    query a control manner corresponding to the preset state; and
    send the alarm in the control manner.

9. A mobile terminal alarm apparatus, comprising:
    a collector configured to collect environmental data of a mobile terminal;
    a processor coupled to a memory and configured to:
        determine, according to the environmental data collected by the collector,
    a scenario in which the mobile terminal is located;
        acquire scenario data whose degree of matching with the scenario is greater than a preset threshold; and
        determine whether the scenario data represents that a potential danger exists in the scenario; and
    a controller coupled to the processor and configured to send an alarm in an alarm manner corresponding to a preset state when the scenario meets a preset alarm condition of the scenario data representing that a potential danger exists in the scenario, and when the mobile terminal is in the preset state.

10. The apparatus according to claim 9, wherein the processor is configured to:
    perform matching between the environmental data and preset environmental scenario data; and
    determine, according to a matching result, the scenario in which the mobile terminal is located.

11. The apparatus according to claim 9, wherein the processor is configured to determine, according to personal information of a user, whether the scenario in which the mobile terminal is located affects health of the user, and wherein the controller is configured to send the alarm in the alarm manner corresponding to the preset state when the scenario in which the mobile terminal is located affects the health of the user, and when the mobile terminal is in the preset state.

12. The apparatus according to claim 9, wherein the controller is further configured to:
   query a control manner corresponding to the preset state; and
   send the alarm in the control manner.

\* \* \* \* \*